United States Patent Office 3,773,940
Patented Nov. 20, 1973

---

3,773,940
1,2,3,8 - TETRAHYDRODIBENZO[3,4:6,7]CYCLO-HEPTA[1,2-c]PYRROLES AS CNS-DEPRESSANTS
Walter Schindler, deceased, late of Riehen, Basel, Switzerland, by Jacques Gosteli and Leonhard Gysin, executors, Basel, Switzerland, assignors to Ciba-Geigy Corporation, Ardsley, N.Y.
No Drawing. Original application May 19, 1971, Ser. No. 145,010, now Patent No. 3,726,897, dated Apr. 10, 1973. Divided and this application Aug. 23, 1972, Ser. No. 283,010
Claims priority, application Switzerland, May 25, 1970, 7,672/70
Int. Cl. A61k 27/00
U.S. Cl. 424—274       4 Claims

ABSTRACT OF THE DISCLOSURE

Compounds of the class of 1,2,3,8-tetrahydrodibenzo[3,4:6,7]cyclohepta[1,2-c]pyrrole which may be substituted in the 2-position by an alkyl group and/or in the 5-position by chlorine or the methyl or the methoxy group respectively and pharmaceutically acceptable acid addition salts thereof have a depressant effect on the central nervous system; they can be prepared from the corresponding 10,11 - bisbromomethyl-5H-dibenzo[a,d]cycloheptenes and a primary amine; the compounds are active ingredients of pharmaceutical compositions.

---

This is a division, of application Ser. No. 145,010, filed May 19, 1971, now U.S. Pat. 3,726,897.

DETAILED DESCRIPTION

The present invention relates to new cycloheptene derivatives to processes for their production, to medicaments containing the new compounds and their use.

More particularly, the present invention relates to compounds of Formula I

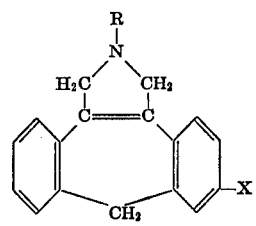

wherein

R represents hydrogen, an alkyl group having at most 4 carbon atoms, or the allyl group, and
X represents hydrogen, chlorine, the methyl or methoxy group, and the pharmaceuticaly acceptable acid addition salts thereof.

In the compounds of Formula I, R as alkyl group is e.g. the methyl, ether, propyl, isopropyl, butyl, sec. butyl or the isobutyl group.

Preferred members of this class are:

(1) 2-ethyl-1,2,3,8-tetrahydrodibenzo[3,4:6,7]cyclohepta[1,2-c]pyrrole
(2) 2-isopropyl-1,2,3,8-tetrahydrodibenzo[3,4:6,7]cyclohepta[1,2-c]pyrrole.
(3) 2-propyl-1,2,3,8-tetrahydrodibenzo[3,4:6,7]cyclohepta[1,2-c]pyrrole
(4) 2-butyl-1,2,3,8-tetrahydrodibenzo[3,4:6,7]cyclohepta[1,2-c]pyrrole
(5) 2-allyl-1,2,3,8-tetrahydrodibenzo[3,4:6,7]cyclohepta[1,2-c]pyrrole
(6) 2-methyl-1,2,3,8-tetrahydrodibenzo[3,4:6,7]cycloheptyl[1,2-c]pyrrole
(7) 2,5-dimethyl-1,2,3,8-tetrahydrodibenzo[3,4:6,7]cycloheptyl[1,2-c]pyrrole and the pharmaceutically acceptable acid addition salts thereof.

Compounds of the Formula I and the pharmaceutically acceptable acid addition salts thereof have valuable pharmacological properties and have a high therapeutic index. In the case of oral, rectal, and parenteral administration they have a central-depressant action, e.g. they potentiate the action of anesthetics. Furthermore, they have an adrenolytic and histaminatagonistic action. These properties are determined by selected standard tests [cp. R Domenjoz and W. Theobald, Arch. Int. Pharmacodyn. 120, 450 (1959), and W. Theobald et al., Arzneimittelforschung 17, 561 (1967)].

Thus, merely by illustration, it is demonstrated that the compounds 1 to 7 as listed above in the form of their methanesulphonic acid salts have the remarkable pharmacological activities the test results of which are listed in the following table:

TABLE

| Compound No. | 50% decrease of orientation motility after i.p. administration on mice; dose in mg./kg. | Adrenolytic activity on isolated organs in comparison with REGITIN=1 | Antagonistic activity to histamine on isolated organs in comparison with ANTERGAN =1 | Prolongation of anaesthesia; determined by alteration of sleeping time after s.c. administration on anaesthetized mice; | |
|---|---|---|---|---|---|
| | | | | Dose in mg./kg. | Alteration in percent |
| 1 | ca. 0.44 | 1.7:1 | 1:1 | 5 | +598 |
| 2 | ca. 2.2 | 11:1 | 1.3:1 | 10 | +124 |
| 3 | ca. 0.63 | φ | 0.88:1 | 5 | +570 |
| 4 | ca. 0.63 | 1:1 | 2.2:1 | 10 | +742 |
| 5 | ca. 2.3 | φ | 1.2:1 | 5 | +213 |
| 6 | ca. 0.53 | 0.17:1 | 1:1 | 5 | +440 |
| 7 | | 0.07:1 | 7.4:1 | 5 | +948 |

Although the methanesulphonic acid salts are preferred also other pharmaceutically acceptable acid addition salts can be used.

The pharmacological properties of the compounds of the present invention render them suitable for the treatment of states of tension and agitation of psychic and muscular genesis.

Compounds of the general Formula I are produced according to the invention by reacting a reactive ester of a compound of the general Formula II:

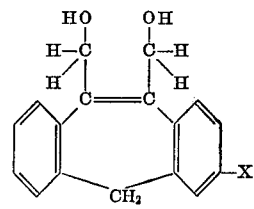

with an amine of the general Formula III:

(III)

wherein R and X have the meaning given under Formula I, and, optionally, converting the obtained reaction product with an inorganic or organic acid into an addition salt. Suitable as reactive esters of compounds of the general Formula II are, e.g. the dichlorides, bis-sulphonic acid esters, e.g. bis-methanesulphonic acid esters, bis-o- and bis-p-toluenesulphonic acid esters, and, in particular, the dibromides.

The reactive esters of compounds of the general Formula II are reacted with the free bases of the general Formula III preferably in the presence of a solvent. Suitable solvents are such which are inert under the reaction conditions, e.g. hydrocarbons such as benzene or toluene, halogenated hydrocarbons such as chloroform, lower alkanols such as methanol or ethanol, ethereal liquids such as ether or dioxane, lower alkanols such as acetone, methyl ethyl ketone, or diethyl ketone, as well as mixtures of such solvents. The reaction is preferably performed at a temperature of ca. 10° to 100° C. Preferably used for the binding of the acid eliminated in the reaction according to the invention is a fairly large excess of the base of the general Formula III.

Compounds which can be used as intermediates for the production of the reactive esters of hydroxy compounds of the general Formula II are: 10,11-dimethyl-5-H-dibenzo[a,d]cycloheptene, as well as the corresponding 2-chloro, 2-methyl, or 2-methoxy derivatives. 10,11-dimethyl-5H-dibenzo[a,d]cycloheptene can be produced e.g. by the following two processes: According to the first process, (9,10-dihydroanthracen-9-yl)-methyl ketone [cp. C.D. Nenitzescu et al., Chem. Ber. 72, 819 (1939)] is methylated with methyl iodide to give (9-methyl-9,10-dihydroanthracen-9-yl)-methyl ketone, which is reduced by sodium borohydride to α,9-dimethyl-9,10-dihydro-9-anthracenemethanol. The reduction product can be subsequently rearranged, according to Wagner-Meerwein, in dilute sulphuric acid and dehydrated. Using the second process, starting with α-phenyl-o-tolylacetonitrile [cp. N. J. Leonard et al., J. Am. Chem. Soc. 77, 5081 (1955)], this is condensed, in the presence of sodium, with diethylcarbonate, to α-phenyl-o-tolylcyanoacetic acid ethyl ester. The condensation product is methylated with methyl iodide, and the methylated compound converted, by subsequent boiling with potassium hydroxide solution, into o-benzylhydratropic acid, which converts in polyphosphoric acid, by elimination of water, to 11-methyl-5,11-dihydro-10H-dibenzo[a,d]cyclohepten-10-one. This ketone yields according to Grignard, with methyl magnesium iodide, 10,11-dimethyl-10,11-dihydro-5H-dibenzo[a,d]cyclohepten-10-ol which, in dilute sulphuric acid, eliminates water. Using the second process it is possible, in an analogous manner, to produce derivatives of 10,11-dimethyl-5H-dibenzoad]cycloheptene, which are substituted in the 2-position by chlorine, the methyl group or the methoxy group.

The obtained intermediate, 10,11 - dimethyl-5H-dibenzo[a,d]cycloheptene, can be subsequently oxidised, e.g. with selenium dioxide, to give 5H-dibenzo[a,d]cycloheptene-10,11-dicarboxaldehyde, which is reduced, e.g. by sodium borohydride, to 5H-dibenzo[a,d]cycloheptene-10,11-dimethanol. The reduction product yields, e.g. with phosphorus tribromide, 10,11-bisbromomethyl - 5H - dibenzo[a,d]cycloheptene, which falls under the reactive esters of the hydroxy compounds of the general Formula II. Further reactive esters of this type can be produced analogously from the above mentioned intermediate products.

Using a second process according to the invention, the compounds of the general Formula I the radical R of which is hydrogen are obtained by hydrolysing a compound of the general Formula IV:

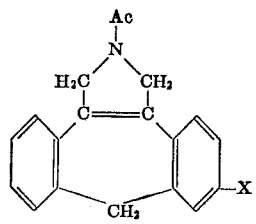
(IV)

wherein Ac represents the acyl radical of an organic acid, and X has the meaning given under Formula I; and, optionally, converting the obtained reaction product into an addition salt with an inorganic or organic acid.

As acyl radical in the starting materials of the general Formula IV, Ac is, in particular, the cyano or chlorocarbonyl group, an alkanoyl or arenecarbonyl group, or the radical of a monofunctional derivative of carbonic acid, thiocarbonic acid, or dithiocarbonyl acid. Mentioned as examples are: for alkanoyl or arenecarbonyl groups: the acetyl or benzoyl group, for radicals of monofunctional derivatives of carbonic acid, of thiocarbonic acid, or of dithiocarbonic acid: the methoxycarbonyl, ethoxycarbonyl, tert. butoxycarbonyl, phenoxycarbonyl, benzyloxycarbonyl, methoxythiocarbonyl, ethoxythiocarbonyl, methylthiothiocarbonyl, or the ethylthiothiocarbonyl group.

The hydrolysis of compounds of the general Formula IV is performed, e.g. by several hours' heating of such compounds in an alkanolic or aqueous-alkanolic alkali hydroxide solution, e.g. by boiling in a mixture of potassium or sodium hydroxide with ethanol or methanol and a little water. Instead of lower alkanols, it is also possible to use other solvents containing hydroxyl groups, such as ethylene glycol or its lower monoalkyl ethers. Moreover, hydrolysis may be effected, especially of compounds of the general Formula IV wherein Ac is the cyano group, also by heating with a mineral acid in an organic-aqueous or aqueous or aqueous medium, e.g. by several hours' boiling in a mixture of 85% phosphoric acid and formic acid, or by several hours' heating in 48% hydrobromic acid to ca. 60° to 120° C.

The starting materials of the general Formula IV are, for their part, produced, e.g. from compounds of the general Formula V:

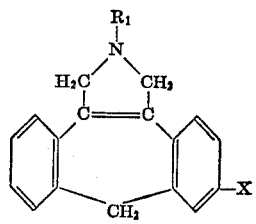
(V)

wherein $R_1$ represents a lower alkyl group, the allyl group or benzyl group, and X has the meaning given under the general formula I by allowing to act on the stated compounds, at room temperature or at elevated temperature, an organic acyl halide, e.g. a cyanogen halide, particularly cyanogen bromide, also phosgene, a chloroformic acid alkyl ester, e.g. the chloroformic acid methyl ester or -ethyl ester, also the chloroformic acid phenyl ester or -benzyl ester, the chloride or bromide of a lower alkanoic acid or of an arenecarbonic acid, especially acetyl chloride, acetyl bromide, or benzoyl chloride, whereby occurs, according to the von Braun reaction, the desired acylation with liberation of an $R_1$-halide, e.g. an alkyl, allyl or benzyl halide. The reaction is performed preferably in an inert organic solvent such as, e.g. chloroform or benzene, or, optionally, also in excess acyl halide.

Starting materials of the general Formula V are, in their turn, produced analogously to the first process by the reaction of a reactive ester of a hydroxy compound of the general formula II with an amine of the general Formula VII:

wherein $R_1$ represents a lower alkyl, the allyl or the benzyl group.

The production of the applied starting compounds, the reactive esters of hydroxy compounds of the general Formula II, has been described after the first process.

The compounds of the general Formula I obtained by the process according to the invention can, optionally, be converted in the usual manner into their addition salts with inorganic and organic acids. For example, to a solution of a compound of the general Formula I in an organic solvent is added the acid desired as the salt component, or a solution of the acid. Preferably chosen for the reaction are organic solvents in which the formed salt is difficultly soluble, so that it can be separated by filtration. Such solvents are, e.g. methanol, acetone, methyl ethyl ketone, acetone/ethanol, methanol/ether, or ethanol/ether.

For use as medicaments it is possible to use, instead of free bases, pharmaceutically acceptable acid addition salts, i.e. salts with such acids of which the anions are not toxic in the case of the dosages in question. Furthermore, it is of advantage if the salts to be used as medicaments crystallise well, are not, or only slightly, hygroscopic. For salt formation with compounds of the general Formula I it is possible to use, e.g. hydrochloric acid, hydrobromic acid, sulphuric acid, phosphoric acid, methanesulphonic acid, ethanesulphonic acid, β-hydroxyethanesulphonic acid, acetic acid, malic acid, tartaric acid, citric acid, lactic acid, oxalic acid, succinic acid, fumaric acid, maleic acid, benzoic acid, salicyclic acid, phenylacetic acid, mandelic acid and embonic acid.

As already mentioned, the new active substances are administered orally, rectally, or parenterally. The dosage depends on the manner of administration, the species, the age, and on the individual condition. The daily dosages of the free bases or of pharmaceutically acceptable salts thereof vary between 0.1 mg./kg. and 10 mg./kg. for warm-blooded animals. Suitable dosage units, such as dragées, tablets, suppositories or ampoules, preferably contain 2–150 mg. of an active substance according to the invention.

Dosage units for oral administration preferably contain as active substance between 1 and 90% of a compound of the general Formula I, or of a pharmaceutically acceptable salt of such a compound. They are produced by combining the active substance, e.g. with solid pulverulent carriers such as lactose, saccharose, sorbitol, mannitol; starches such as potato starch, maize starch or amylopectin, also laminaria powder or citrus pulp powder; cellulose derivatives or gelatine, optionally with the addition of lubricants such as magnesium or calcium stearate, or polyethylene glycols, to form tablets or dragée cores. The dragée cores are coated, e.g. with conc. sugar solutions which may also contain, e.g. gum arabic, talcum and/or titanium dioxide; or they are coated with a lacquer dissolved in readily volatile organic solvents or mixtures of solvents. Dyestuffs may be added to these coatings, e.g. for identification of the varying dosages of active substance.

Further dosage units suitable for oral administration are hard gelatine capsules, as well as soft closed capsules made from gelatine and a softener such as glycerin. The hard capsules contain the active substance preferably as a granulate, e.g. in admixture with fillers such as maize starch, and/or lubricants such as talcum or magnesium stearate, and, optionally, stabilisers such as sodium metabisulphite ($Na_2S_2O_5$), or ascorbic acid. In soft capsules, the active substance is preferably dissolved or suspended in suitable liquids such as liquid polyethylene glycols, whereby likewise stabilisers may be added.

Suitable dosage units for rectal administration are, e.g. suppositories consisting of a combination of an active substance with a fatty base. Also suitable are gelatine rectal capsules containing a combination of the active substance with polyethylene glycol.

Ampoules for parenteral administration, especially intramuscular administration, preferably contain as active substance a water-soluble salt in a concentration of preferably 0.5–5%, optionally together with suitable stabilisers and buffer substances, in aqueous solution.

The following prescriptions further illustrate the production of tablets, dragées, capsules, suppositories and ampoules:

(a) An amount of 250 g. of 2-methyl-1,2,3,8-tetrahydrodibenzo[3,4:6,7]cyclohepta[1,2 - c]pyrrole - methanesulphonate is mixed together with 175.80 g. of lactose and 169.70 g. of potato starch; the mixture is then moistened with an alcoholic solution of 10 g. of stearic acid, and granulated through a sieve. After drying of the granulate, 160 g. of potato starch, 200 g. of talcum, 2.50 g. of magnesium stearate, and 32 g. of colloidal silicon dioxide are mixed in; the obtained mixture is then pressed to form 10,000 tablets each weighing 100 mg. and each containing 25 mg. of active substance. If required, the tablets may be provided with grooves for a more precise adjustment of the dosage amount.

(b) A granulate is produced from 250 g. of 2-methyl-1,2,3,8 - tetrahydrodibenzo[3,4:6,7]cyclohepta[1,2-c]pyrrole-methanesulphate, 175.90 g. of lactose, and the alcoholic solution of 10 g. of stearic acid; after drying, the granulate is mixed with 56.60 g. of colloidal silicon dioxide, 165 g. of talcum, 20 g. of potato starch, and 2.50 g. of magnesium stearate; and the mixture is then pressed to form 10,000 dragée cores. These are subsequently coated with a concentrated syrup made from 502.28 g. of crystallised saccharose, 6 g. of shellac, 10 g. of gum arabic, 0.22 g. of dyestuff, and 1.5 g. of titanium dioxide, and then dried. The obtained dragées each weigh 120 mg., and each contain 25 mg. of active substance.

(c) To produce 1,000 capsules each containing 25 mg. of active substance, 25 g. of 2-methyl-1,2,3,8-tetrahydrodibenzo[3,4:6,7]cyclohepta[1,2 - c]pyrrole - methanesulphonate are mixed with 248 g. of lactose; the obtained mixture is evenly moistened with an aqueous solution of 2 g. of gelatine, and then granulated through a suitable sieve (e.g. Sieve III according to Ph. Helv. V). The granulate is mixed with 10 g. of dried maize starch and 15 g. of talcum, and the mixture evenly filled into 1,000 hard gelatine capsules, Size 1.

(d) A suppository foundation substance is prepared from 2.5 g. of 2-methyl-1,2,3,8-tetrahydrodibenzo-[3,4:6,7]cyclohepta[1,2-c]pyrrole - methanesulphonate and 167.5 g. of adeps solidus; it is then used to fill 100 suppositories each containing 25 mg. of active substance.

(e) A solution of 25 g. of 2-methyl-1,2,3,8-tetrahydrodibenzo[3,4:6,7]cyclohepta[1,2 - c]pyrrole - methanesulphonate in one litre of water is filled into 1,000 ampoules, and then sterilised. An ampoule contains a 2.5% solution of 25 mg. of active substance.

It is also possible to use, as active substance for tablets, dragées, capsules, suppositories, and ampoules, the same amount of the following compounds:

2-ethyl-1,2,3,8-tetrahydrodibenzo[3,4:6,7]cyclohepta-[1,2-c]pyrrole-methanesulphonate.

2-propyl-1,2,3,8-tetrahydrodibenzo[3,4:6,7]cyclohepta-[1,2-c]pyrrole-methanesulphonate.

2-isopropyl-1,2,3,8-tetrahydrodibenzo[3,4:6,7]cyclohepta[1,2-c]pyrrole-methanesulphonate.

2-butyl-1,2,3,8-tetrahydrodibenzo[3,4:6,7]cyclohepta-[1,2-c]pyrrole-methanesulphonate.

2-allyl-1,2,3,8-tetrahydrodibenzo[3,4:6,7]cyclohepta-[1,2-c]pyrrole-methanesulphonate.

The following examples further illustrate the production of the new compounds of the general Formula I and of intermediates not described hitherto; the examples, however, do not in any way limit the scope of the invention. The temperatures are given in degrees centigrade.

Example 1

(a) An amount of 18.9 g. (0.05 mol) of 10,11-bis-bromomethyl-5H-dibenzo[a,d]cycloheptene is dissolved in 75 ml. of benzene. This solution is added dropwise at 40° within one hour, to a solution of 46.5 g. (1.5 mol) of methylamine in 270 ml. of methanol. The reaction mixture is stirred for a further one hour at 50°, and the excess methylamine and the solvent are subsequently distilled off. To the residue are added 50 ml. of water, and the formed emulsion is extracted with ether. The ethereal solution is washed with water, dried over potassium carbonate, and concentrated by evaporation. The residue, which is recrystallised from petroleum ether, yields 2-methyl - 1,2,3,8 - tetrahydrodibenzo[3,4:6,7]cyclohepta[1,2-c]pyrrole, M.P. 146–148°.

An amount of 9.4 g. of the obtained base is dissolved in 150 ml. of abs. acetone; to the solution are carefully added 3.64 g. of methanesulphonic acid, whereupon the methanesulphonate crystallises out and melts, after recrystallisation from abs. ethanol, at 156–159°.

The starting material is produced as follows:

(b) 26.71 g. (0.120 mol) of (9,10-dihydroanthracen-9-yl)-methyl ketone [cp. C. D. Nenitzescu et al., Chem. Ber. 72, 819 (1939)] and 8.00 ml. (0.128 mol) of methyl iodide are dissolved, under nitrogen and with vigorous stirring, with 120 ml. of abs. ethylene glycol dimethyl ether. The solution is cooled in an ice bath to 3°, and to the solution are added, in portions, 6.5 g. (0.98 mol) of a 50% dispersion of sodium hydride in paraffin oil, which had previously been washed twice with hexane. The reaction mixture is then further stirred at the following temperatures: for 30 minutes at 10°; after addition of 1 ml. (0.128 mol) of methyl iodine, for one hour at 35–37°; and subsequently for 15 hours at room temperature. The obtained suspension is filtered off, the filtrate concentrated in vacuo to 85 g., and 120 g. of ice, 100 ml. of water, and 200 ml. of methylene chloride are added. To the mixture are then added some drops of glacial acetic acid until a neutral reaction of the aqueous phase is obtained. The organic phase is separated, washed with water, dried over sodium sulphate, and concentrated in vacuo. The oily residue is fractionated by distillation in high vacuum, whereupon 26.64 g. of (9-methyl-9,10-dihydroanthracen-9-yl)-methyl ketone are obtained, B.P. 100–115°/0.002 torr.

A sample of the obtained oil is dissolved in abs. benzene, and chromatographed on a column of 20-fold the amount of silica gel (Merck®, particle size 0.05–0.2 mm.) using the elution method. As the elution agent is used absolute benzene. The benzene solution is concentrated in vacuo, the residue taken up in hexane, and the undissolved oil separated. The hexane solution is concentrated by evaporation, whereupon pure (9-methyl-9,10-dihydroanthracen-9-yl)-methyl ketone, M.P. 48–51°, crystallises out.

The obtained compound is readily oxidisable; it should be stored under nitrogen in a refrigerator.

(c) An amount of 26.3 g. (0.112 mol) of the ketone prepared according to (b), B.P. 100–115°/0.002 torr, containing small amounts of apolar impurities is dissolved in 30 ml. of methanol and 15 ml. of water. The solution is cooled to 3°, and to it are added within one minute, with stirring, 3.00 g. (0.800 mol) of sodium borohydride; stirring is then continued for 2 hours in an ice bath. The reaction mixture is extracted twice with 300 ml. of hexane each time; the hexane extracts are then combined, and extracted with 300 ml. of 95% methanol. The methanolic extract is concentrated in vacuo until the weight is 103 g. The obtained emulsion is diluted with 200 ml. of water and extracted with methylene chloride. The methylene chloride solution is washed with water, dried over sodium sulphate, and concentrated in vacuo to obtain $\alpha$,9 - dimethyl-9,10-dihydro-9-anthracenemethanol, which is used as crude product.

A sample of the crude product is recrystallised, whilst being cooled with Dry Ice, from methanol/water; M.P. of the pure compound=47–52°.

This compound too is readily oxidisable; it must be stored under nitrogen in a refrigerator.

(d) An amount of 23.05 g. (0.097 mol) of the hydroxy compound produced according to (c) is dissolved in 200 ml. of pure methylene chloride. The solution is cooled with an ice bath; to the solution are then added, with vigorous stirring, 90 ml. of conc. sulphuric acid/water (10:1) (volume ratio), the ice bath is removed, and the mixture stirred for a further 15 minutes. The reaction mixture is then poured onto 500 g. of ice, 500 ml. of water and 200 ml. of methylene chloride. The mixture is shaken, and the organic phase separated. The methylene chloride solution is washed with water, dried over sodium sulphate, and concentrated in vacuo. The residue is dissolved in 200 ml. of hexane; the hexane solution is then treated with 10 g. of silica gel, filtered off from the silica gel, and subsequently washed with hexane. The hexane solution is concentrated in vacuo, and the residue recrystallised from methanol. Thus obtained is 10,11-dimethyl-5H-dibenzo[a,d]cycloheptene, M.P. 73–74.5°.

(e) An amount of 44 g. (0.200 mol) of the dimethyl compound obtained according to (d) is dissolved, with stirring, in a mixture of 2 litres of glacial acetic acid and 30 ml. of acetic acid anhydride. To this solution are added 44 g. (0.400 mol) of selenium dioxide, and refluxing is then carried out for 12 hours. The formed selenium is afterwards separated by filtration, and the filtrate concentrated in vacuo. The residue is dissolved in ether, the ethereal solution washed neutral with 2-n sodium hydroxide solution and water, dried over sodium sulphate, and concentrated by evaporation. As residue remains 5H-dibenzo[a,d]cycloheptene-10,11-dicarboxaldehyde, which is used as crude product.

(f) An amount of 49.1 g. (0.238 mol) of the dialdehyde obtained according to (a) is dissolved, with stirring and cooling, in 1.2 litres of methanol. To this solution are added in portions, within one hour, 50 g. (1.319 mol) of sodium borohydride, so that the reaction temperature is 15–25°. The reaction mixture is then refluxed for 4 hours, and the methanol subsequently distilled off in vacuo. To the residue is added water, and the obtained suspension extracted with ether. The ethereal solution is washed with water, dried over potassium carbonate, and concentrated to a small volume, whereby 5H-dibenzo[a,d]cycloheptene - 10,11 - dimethanol, M.P. 174–176°, crystallises out.

(g) An amount of 34 g. (0.135 mol) of the diol obtained according to (f) is dissolved, with stirring, in 405 ml. of chloroform. To this solution are added within 30 minutes at a reaction temperature of 5–10°, with ice cooling, 36.6 g. (0.135 mol) of phosphorus tribromide dissolved in 270 ml. of chloroform. The reaction mixture is stirred for a further 15 hours at room temperature, then poured onto ice, and the organic phase separated. The organic phase is washed with water, dried over sodium sulphate, and concentrated by evaporation. The residue, recrystallised from ethanol, yields 10,11-bisbromomethyl-5H-dibenzo[a,d]cycloheptene, M.P. 145–147°.

(h) The 10,11-dimethyl-5H-dibenzo[a,d]cycloheptene produced according to (d) can also be prepared as follows:

An amount of 1830 ml. of diethyl carbonate is heated, with stirring, to 100°, and within one hour are then added 77.5 g. (3.40 mol) of sodium, whereby the temperature is maintained between 100 and 110°. At the same temperature is then added dropwise, within 3 hours, a solution of 708 g. (3.40 mol) of α-phenyl-o-tolylacetonitrile, B.P. 114–116°/0.01 torr [cp. N. J. Leonard et al., J. Am. Chem. Soc. 77, 5081 (1955)] in 850 ml. of diethyl carbonate. After the dropwise addition, the formed ethanol is distilled off, whereby the internal temperature gradually rises within 3 hours to 120°. The reaction mixture is thereupon cooled to 20°, and then stirred into a mixture of 1.7 kg. of ice and 425 ml. of concentrated hydrochloric acid. The obtained suspension is extracted with ether, the ethereal solution washed with water, dried over sodium sulphate, and concentrated by evaporation. Distillation of the residue in high vacuum yields α-phenyl-o-tolylcyanoacetic acid ethyl ester, B.P. 157–159/0.08 torr.

(i) An amount of 25.2 g. (1.095 mol) of sodium is dissolved, with stirring, in 532 ml. of abs. ethanol; the solution is then cooled to 40°, and within 5 minutes is added a solution of 309 g. (1.095 mol) of the ester prepared according to (h) in 625 ml. of abs. ethanol. The whole is then cooled to 20°, and within 30 minutes are added dropwise 177 g. (1.25 mol) of methyl iodide, refluxing being then carried out for 6 hours. The reaction mixture is afterwards cooled to 20°; to the mixture are then added 520 ml. of 50% potassium hydroxide solution, refluxing is carried out for 18 hours, and the ethanol/water mixture evaporated off in vacuo. The residue remaining is dissolved in 3 litres of water, and this solution is rendered, with 700 ml. of concentrated hydrochloric acid, acid to a congo-red indicator, whereby o-benzyl-hydrotropic acid crystallises out. The crude product is filtered off, washed with water, dried in vacuo at 60°, and recrystallised from 50% ethanol, M.P. 94–96°.

(j) 217 g. (0.91 mol) of o-benzyl-hydratropic acid and 2170 g. of polyphosphoric acid are heated, with thorough stirring, for 75 minutes to 80°. The hot reaction mixture is subsequently poured onto 3 liters of water, the suspension stirred, and the temperature maintained, by the addition of ice, between 20 and 40°. The precipitated crystals are filtered off, and dissolved in ether. The ethereal solution is washed with water, dried over sodium sulphate, and concentrated by evaporation. The residue is distilled in high vacuum. The crude product boils at B.P. 135–140°/0.03 torr. The distillate is crystallised from methanol, whereupon 11-methyl-5,11-dihydro-10H-dibenzo[a,d]cyclohepten-10-one melts at 94–96°.

(k) To a Grignard-solution prepared from 32 g. (1.3 mol) of magnesium, 185 g. (1.3 mol) of methyl iodide and 420 ml. of abs. ether is added dropwise within 4 hours, with thorough stirring, a solution of 145 g. (0.65 mol) of the ketone obtained according to (j) in 635 ml. of abs. benzene, whereby a reaction temperature of −10 to 0° is maintained. The reaction mixture is subsequently heated to 45°; it is then stirred for 15 hours at this temperature, cooled, and afterwards poured, with stirring, into a solution of 580 g. of ammonium chloride in 2 litres of water. The organic phase is separated, and the aqueous phase extracted with benzene. The combined organic solutions are washed with water, dried over sodium sulphate, and concentrated in vacuo. Remaining as residue is 10,11-dimethyl-10,11-dihydro-5H-dibenzo[a,d]cyclohepten-10-ol as a viscous oil.

(l) 156 g. of the hydroxy compound obtained according to (k) and 780 ml. of 2-n sulphuric acid are refluxed, with stirring, for 14 hours. The mixture is then cooled to 20°, extracted with ether, the organic phase washed with water, dried over sodium sulphate, and concentrated by evaporation. The residue is purified by fractionated crystallisation from methanol, whereupon is obtained 10,11-dimethyl-5H-dibenzo[a,d]cycloheptene, M.P. 71–72°.

Example 2

The following final products are produced analogously to Example 1(a):

from 18.9 g. (0.05 mol) of 10,11-bisbromomethyl-5H-dibenzo[a,d]cycloheptene and 67.5 g. (1.5 mol) of ethylamine in 270 ml. of methanol: 2-ethyl-1,2,3,8-tetrahydrodibenzo[3,4 : 6,7]cyclohepta[1,2 - c]pyrrole, M.P. 124–125° (from petroleum ether); methanesulphonate, M.P. 194–197° (from abs. ethanol);

from 9.45 g. (0.025 mol) of 10,11-bisbromomethyl-5H-dibenzo[a,d]cycloheptene and 14.75 g. (0.25 mol) of propylamine in 55 ml. of methanol: 2-propyl-1,2,3,8-tetrahydrodibenzo[3,4 : 6,7]cyclohepta[1,2 - c]pyrrole, M.P. 67–68° (from petroleum ether); methanesulphonate, M.P. 228–230° (from abs. ethanol);

from 9.45 g. (0.025 mol) of 10,11-bisbromomethyl-5H-dibenzo[a,d]cycloheptene and 14.75 g. (0.25 mol) of isopropylamine in 55 ml. of methanol: 2-isopropyl-1,2,3,8 - tetrahydrodibenzo[3,4:6,7]cyclohepta[1,2 - c]pyrrole, M.P. 118–120° (from petroleum ether); methanesulphonate, M.P. 254–257° (from abs. ethanol);

from 9.45 g. (0.025 mol) of 10,11-bisbromomethyl-5H-dibenzo[a,d]cycloheptene and 18.25 g. (0.25 mol) of butylamine in 55 ml. of methanol: 2-butyl-1,2,3,8-tetrahydrodibenzo[3,4:6,7]cyclohepta[1,2 - c]pyrrole, M.P. 88–90° (from petroleum ether); methanesulphonate, M.P. 176–179° (from abs. ethanol);

from 18.9 g. (0.05 mol) of 10,11-bisbromomethyl-5H-dibenzo[a,d]cycloheptene and 28.5 g. (0.50 mol) of allylamine in 110 ml. of methanol: 2-allyl-1,2,3,8-tetrahydrodibenzo[3,4:6,7]cyclohepta[1,2 - c]pyrrole, M.P. 76–77° (from petroleum ether); methanesulphonate, M.P. 245–247° (from abs. ethanol); and from 9.45 g. (0.025 mol) of 10,11-bisbromomethyl-5H-dibenzo[a,d]cycloheptene and 18.25 g. (0.25 mol) of isobutylamine in 55 ml. of methanol: 2-isobutyl-1,2,3,8-tetrahydrodibenzo[3,4 : 6,7]cyclohepta[1,2 - c]pyrrole and its methanesulphonate.

Example 3

(a) 1.52 g. (0.005 mol) of 1,2,3,8-tetrahydrodibenzo[3,4:6,7]cyclohepta[1,2-c]pyrrole-2-carboxylic acid ethyl ester and a mixture of 11.4 ml. of glacial acetic acid and 3.9 ml. (0.035 mol) of 48% hydrobromic acid are refluxed for 3 hours. The reaction mixture is afterwards poured on to water, and rendered, with conc. ammonia, phenolphthalein-alkaline. The obtained emulsion is extracted with ether, the ether solution washed with water, dried over potassium carbonate, and concentrated by evaporation. The residue, which is recrystallised from cyclohexane, yields 1,2,3,8-tetrahydrodibenzo[3,4:6,7]cyclohepta[1,2-c]pyrrole, M.P. 121–122°.

The starting material is produced as follows:

(b) An amount of 7.6 g. (0.028 mol) of 2-allyl-1,2,3,8-tetrahydrodibenzo[3,4 : 6,7]cyclohepta[1,2 - c]pyrrole is dissolved in 50 ml. of abs. benzene, and the solution refluxed with stirring. Within one hour is added dropwise a solution of 3.4 g. (0.033 mol) of chloroformic acid ethyl ester in 50 ml. of abs. benzene, and the formed allyl chloride simultaneously distilled off. After completion of the dropwise addition, boiling is maintained for a further hour, and the solution then cooled to room temperature. The reaction solution is washed with 2-n hydrochloric acid and then with water; it is then dried over sodium sulphate and concentrated in vacuo to a small volume, whereupon 1,2,3,8-tetrahydrodibenzo[3,4:6,7]cyclohepta[1,2-c]pyrrole-2-carboxylic acid ethyl ester, M.P. 145–147°, crystallises out.

Example 4

Analogously to Example 1(a) the following final products are prepared:

(a) from 12.3 g. (0.03 mol) of 2-methoxy-10,11-bisbromomethyl-5H-dibenzo[a,d]cycloheptene and 18.6 g.

(0.6 mol) of methylamine in 100 ml. of methanol the 2-methyl - 5 - methoxy-1,2,3,8-tetrahydro-dibenzo[3,4:6,7]cyclohepta[1,2-c]pyrrole; M.P. 128°–130° (from hexane); oxalate: M.P. 134–138° (from abs. ethanol);

(a¹) from 9.5 g. (0.023 mol) of 2-methoxy-10,11-bisbromomethyl-5H-dibenzo[a,d]cycloheptene and 21.0 g. (0.47 mol) of ethylamine in 100 ml. of methanol the 2-ethyl - 5 - methoxy - 1,2,3,8 - tetrahydro-dibenzo[3,4:6,7]cyclohepta[1,2-c]pyrrole; M.P. 95–97° (from hexane); methanesulphonate: M.P. 164–167 (from ethanol).

The 2 - methoxy - 10,11 - bisbromomethyl - 5H-dibenzo[a,d]cycloheptene (M.P. 110–111°) required as starting material is prepared analogously to Example 1(h) to 1(l) followed by the process analogously to Examples 1(e) to 1(g) through the following intermediate compounds (b¹) to (b⁸):

(b¹) from α-(p-methoxyphenyl)-o-tolyl - acetonitrile the α-(p-methoxyphenyl)-o-tolyl-cyanacetic acid ethylester, B.P. 160–165°/0.02 torr; the further intermediates are obtained therefrom:

(b²) o-(p-methoxybenzyl)-hydratropic acid, M.P. 88–90° (from petroleum ether);

(b³) 8-methoxy-11-methyl-5,11-dihydro - 10H - dibenzo[a,d]cyclohepten - 10 - one, M.P. 101–102° (from hexane);

(b⁴) 8-methoxy-10,11-dimethyl-10,11 - dihydro - 5H - dibenzo[a,d]cyclohepten - 10 - ol, M.P. 150–152° (from ethanol);

(b⁵) 2-methoxy-10,11-dimethyl - 5H - dibenzo[a,d]cycloheptene; M.P. 80–82° (from hexane);

(b⁶) 2-methoxy - 5H - dibenzo[a,d]cycloheptene - 10,11-dicarboxaldehyde; crude product;

(b⁷) 2-methoxy-5H-dibenzo[a,d]cyclohepten - 10,11 - dimethanol; M.P. 137–140° (from ethylacetate);

(b⁸) 2-methoxy - 10,11 - bisbromomethyl - 5H - dibenzo[a,d]cycloheptene; M.P. 110°–111° (from hexane).

Example 5

Analogously to Example 1(a) the following final products are prepared:

(a) from 11.8 g. (0.03 mol) of 2-methyl-10,11-bisbromomethyl-5H-dibenzo[a,d]cycloheptene and 18.6 g. (0.6 mol) of methylamine in methanol the 2,5-dimethyl-1,2,3,8-tetrahydro-dibenzo[3,4:6,7]cyclohepta[1,2 - c]pyrrole; M.P. 139–140° (from hexane); methanesulphonate: M.P. 170–173° (from abs. ethanol);

(a¹) from 11.8 g. (0.03 mol) of 2-methyl - 10,11 - bisbromomethyl-5H-dibenzo[a,d]cycloheptene and 27.0 g. (0.6 mol) of ethylamine in 115 ml. of methanol the 2-ethyl-5-methyl - 1,2,3,8 - tetrahydro - dibenzo[3,4:6,7]cyclohepta[1,2-c]pyrrole; M.P. 111–113° (from hexane); methanesulphonate: M.P. 223–225° (from abs. ethanol);

The 2-methyl-10,11-bisbromomethyl-5H - dibenzo[a,d]cycloheptene, M.P. 119–121°, required as starting material, is prepared analogously to Examples 1(h) through 1(l) followed by the process analogous to Example 1(e) through 1(g) through the intermediate compounds (b¹) to (b⁸):

(b¹) from α(p-tolyl)-o-tolyl-acetonitrile the α-(p-tolyl)-o-tolyl-cyanacetic acid ethyl ester, crude product; the following intermediate compounds are prepared therefrom:

(b²) o-(p-methylbenzyl)-hydratropic acid, M.P. 120–122° (from cyclohexane);

(b³) 8,11-dimethyl - 5,11 - dihydro - 10H - dibenzo[a,d]cyclohepten-10-one, M.P' 92–94° (from methanol);

(b⁴) 8,10,11-trimethyl - 10,11 - dihydro - 5H - dibenzo[a,d]cyclohepten-10-ol, crude product;

(b⁵) 2,10,11-trimethyl - 5H - dibenzo[a,d]cycloheptene; M.P. 105–108° (from hexane);

(b⁶) 2-methyl-5H - dibenzo[a,d]cyclohepten - 10,11 - dicarboxaldehyde, crude product;

(b⁷) 2-methyl-5H - dibenzo[a,d]cyclohepten - 10,11 - dimethanol; M.P. 182–183° (from ethyl acetate);

(b⁸) 2-methyl-10,11-bisbromomethyl - 5H - dibenzo[a,d]cycloheptene; M.P. 119–121° (from hexane).

Example 6

Analogously to Example 1(a) the following final product is prepared:

(a) from 12.0 g. (0.029 mol) of 2 - chloro - 10,11 - bisbromomethyl-5H-dibenzo[a,d]cycloheptene and 17.5 g. (0.58 mol) of methylamine in 100 ml. of methanol the 2-methyl-5-chloro - 1,2,3,8 - tetrahydro - dibenzo[3,4:6,7]cyclohepta[1,2-c]pyrrole; M.P. 149–152° (from ethyl acetate); methane-sulphonate: M.P. 202–204° (from abs. ethanol);

The 2-chloro-10,11-bisbromomethyl - 5H - dibenzo[a,d]cycloheptene, M.P. 141–144°, is prepared analogously to Examples 1(h) through 1(l) followed by the process analogously to Examples 1(e) through 1(g) through the following intermediate compounds (b¹) to (b⁸):

(b¹) from α-chlorophenyl - o - tolyl-acetonitrile the α-(p-chlorophenyl)-o-tolyl-cyanacetic acid ethyl ester; B.P. 165–167°/0.03 torr; the following intermediate are obtained therefrom:

(b²) o-(p-chlorobenzyl)-hydratropic acid, M.P. 126–128° (from ether);

(b³) 8-chloro-11-methyl-5,11 - dihydro - 10H - dibenzo[a,d]cyclohepten - 10 - one; M.P. 116–117° (from ethanol);

(b⁴) 8-chloro-10,11-dimethyl-10,11 - dihydro - 5H - dibenzo[a,d]cyclohepten-10-ol, crude product;

(b⁵)-2-chloro - 10,11 - dimethyl - 5H - dibenzo[a,d]cycloheptene;

(b⁶) 2-chloro-5H-dibenzo[a,d]cycloheptene - 10,11 - dicarboxaldehyde, crude product;

(b⁷) 2-chloro-5H-dibenzo[a,d]cyclohepten - 10,11 - dimethanol; M.P. 190–191° (from ethyl acetate);

(b⁸) 2-chloro-10,11-bisbromomethyl - 5H - dibenzo[a,d]cycloheptene; M.P. 141–144° (from cyclohexane).

What we claim is:

1. A thereapeutic preparation for the treatment of states of tension and agitation, which comprises a central nervous system depressant amount of a compound of the Formula I

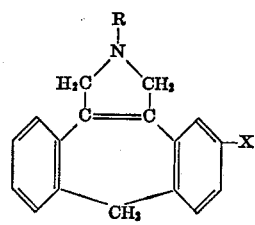

(I)

wherein

R is hydrogen, an alkyl group having at most 4 carbon atoms, or the allyl group, and X is hydrogen, chlorine, the methyl or methoxy group, or a pharmaceutically acceptable acid addition salt thereof, in admixture with a pharmaceutical carrier.

2. A preparation as claimed in claim 1, in which compound is the 2-methyl-1,2,3,8-tetrahydrodibenzo[3,4:6,7]cyclohepta[1,2-c]pyrrole or a pharmaceutically acceptable acid addition salt thereof.

3. A preparation as claimed in claim 1, in which compound is the methane-sulfonate salt of 2-methyl-1,2,3,8-tetrahydrodibenzo[3,4:6,7]cyclohepta[1,2-c]pyrrole.

4. A method of treating states of tension and agitation in mammals comprising the oral, rectal, or parenteral administration to said mammal of a therapeutically effective amount of a compound of claim 1.

References Cited

FOREIGN PATENTS 1,489,420   7/1967   France.

STANLEY J. FRIEDMAN, Primary Examiner